United States Patent
Ishikawa

(10) Patent No.: US 6,557,205 B2
(45) Date of Patent: May 6, 2003

(54) WIPER APPARATUS WITH ROTARY HOUSING

(75) Inventor: Masaru Ishikawa, Yokohama (JP)

(73) Assignee: Jidosha Denki Kogyo Kabushiki Kaisha, Kanagawa (JP)

( * ) Notice: Subject to any disclaimer, the term of this patent is extended or adjusted under 35 U.S.C. 154(b) by 18 days.

(21) Appl. No.: 09/879,185

(22) Filed: Jun. 13, 2001

(65) Prior Publication Data
US 2001/0052164 A1 Dec. 20, 2001

(30) Foreign Application Priority Data
Jun. 14, 2000 (JP) ........................ 2000-178541

(51) Int. Cl.⁷ ................. B60S 1/26; B60S 1/58
(52) U.S. Cl. ................. 15/250.21; 15/250.13; 296/96.17; 74/98
(58) Field of Search ................. 15/250.21, 250.13, 15/250.23, 250.3, 250.31; 74/109, 660, 422, 98; 296/96.17

(56) References Cited

U.S. PATENT DOCUMENTS

| | | | | |
|---|---|---|---|---|
| 2,516,808 A | * | 7/1950 | Seger .................... | 15/250.21 |
| 3,570,039 A | * | 3/1971 | Ichinose et al. ......... | 15/250.13 |
| 3,590,415 A | * | 7/1971 | Mori .................... | 15/250.21 |
| 3,651,699 A | | 3/1972 | Thomas ................. | 15/250.3 |
| 4,642,838 A | | 2/1987 | Fuzita et al. ............ | 15/250.21 |
| 4,732,048 A | * | 3/1988 | Sakakibara et al. ...... | 15/250.21 |

FOREIGN PATENT DOCUMENTS

FR      1053519    *   9/1953  ............. 15/250.21

* cited by examiner

*Primary Examiner*—Gary K. Graham
(74) *Attorney, Agent, or Firm*—Sughrue Mion, PLLC

(57) ABSTRACT

A wiper apparatus suitable to wipe the window pane of laterally elongated type, which is provide with a reversible wiper motor 2; a reciprocally rotating output shaft 2a; a circular shaped rotary housing 3 fixed to the output shaft; a stationary gear 4 disposed coaxially around about the output; an idler gear 5 meshed with the stationary gear and supported rotatably on the rotary housing; an output gear 6 meshed with the idler gear and supported rotatably on the rotary housing; and a pivot shaft 20 fixed to the output gear and connected with a wiper member 7, 8; the gears 4, 5 and 6 are housed in the rotary housing 3.

5 Claims, 6 Drawing Sheets

WIPER APPARATUS WITH ROTARY HOUSING

BACKGROUND OF THE INVENTION

1. Field of the Invention

This invention relates to a wiper apparatus for wiping a window pane of the windshield, the rear window or so of vehicles with a wiper blade and, more particularly, to an improved apparatus suitable for wiping the window pane in a laterally elongated shape.

2. Description of the Prior Art

As the wiper apparatus for wiping the windshield, the apparatus is known, which is provided with a wiper motor, a pivot shaft, a wiper arm attached to the pivot shaft, a wiper blade connected to the wiper arm, and a wiper linkage connecting between the wiper motor and the pivot shaft, and structured so that the pivot shaft may be reciprocally turned according to rotation of the wiper motor through the wiper linkage, thereby oscillating the wiper arm on the windshield around the pivot shaft. Whereby the wiper blade connected to the wiper arm wipes the windshield by moving reciprocally in an arc in accordance with the oscillating movement of the wiper arm at the same time of being pressed against the windshield.

In the conventional wiper apparatus structured so that the wiper blade moves on the circular arc, when the apparatus is applied to wipe the windshield in a laterally elongated type, unwiped zones are left on both sides of the windshield. In order to prevent the occurrence of such the unwiped zone on the windshield, it has been tried to develop the wiper apparatus as disclosed in U.S. Pat. No. 4,642,838 or U.S. Pat. No. 3,651,699, which is possible to send the wiper blade so far as the both sides of the windshield by mechanically stretching the wiper blade by using the linkage at the time of wiping the both sides of the windshield. However, in the wiper apparatus of this kind, it is necessary to use the oversized specific linkage for extending the length of the wiper blade, accordingly there is a problem in that it is disadvantageous to apply such the wiper apparatus in view of configuration apace.

Furthermore, in the wiper apparatus provided with a planetary gear, a housing member contained with the planetary gear is formed in a lengthy oval shape, therefore the housing member of the planetary gear and the wiper arm overlap each other crosswise at the time of the operation. Accordingly, there is another problem in that there is the possibility that foreign substances may be caught between the housing member and the wiper arm.

SUMMARY OF THE INVENTION

It is, therefore, an object of this invention to provide a wiper apparatus, which is simple in the construction, but is possible to wipe the window pane without leaving unwiped zones even if it is applied to the window of the laterally elongated type, and possible to prevent foreign substances from being caught between wiper members.

The constitution of the wiper apparatus according to this invention for achieving the aforementioned object is characterized by comprising a wiper motor of a reversible type fixed on a body of said vehicle; a output shaft rotated reciprocally by the wiper motor in clockwise and anti-clockwise directions alternatively; a rotary housing fixed to the output shaft for rotating reciprocally together with the output shaft; a stationary gear disposed coaxially around about the output shaft and fixed on the vehicle body; an idler gear supported rotatably on the rotary housing and meshed with the stationary gear for reciprocally rotating on the rotary housing according to the reciprocating rotation of the rotary housing; an output gear supported rotatably on the rotary housing and driven rotationally by engaging with the idler gear; a pivot shaft supported rotatably on the rotary housing and fixed to the output gear; a wiper arm connected to the pivot shaft; and a wiper blade held by the wiper arm, wherein the rotary housing is formed in a circular shape, fixed coaxially to the output shaft and have a radius sufficient to house the stationary gear, the idler gear and the output gear.

In the wiper apparatus according to this invention, when the rotary housing contained with the stationary gear, the idler gear and the output gear is rotated reciprocally according to the reciprocal rotation of the output shaft by supplying an electric current to the wiper motor, the pivot shaft is rotated reciprocally against the reciprocally rotating rotary housing through the stationary gear, the idler gear and the output gear. Whereby, the wiper arm connected to the pivot shaft is oscillated above the windshield and the wiper blade held by the wiper arm wipes the window pane of the vehicle.

In this time, the wiper blade reaches a place more distant from the axis of the output shaft of the wiper apparatus because the substantial length of the wiper arm is elongated as much as a distance between the output shaft and the pivot shaft of the rotary housing. Therefore, the window pane of the laterally elongated type is wiped completely without leaving unwiped zones at the upper parts on the both sides thereof.

Furthermore, the rotary housing is formed in a circular shape with a radius sufficient to cover or house the aforementioned gears, accordingly foreign substances are never caught between the rotary housing and the wiper arm even in the case the rotary housing is rotated reciprocally.

DETAILED DESCRIPTION OF THE PREFERRED EMBODIMENT

Figure 1:
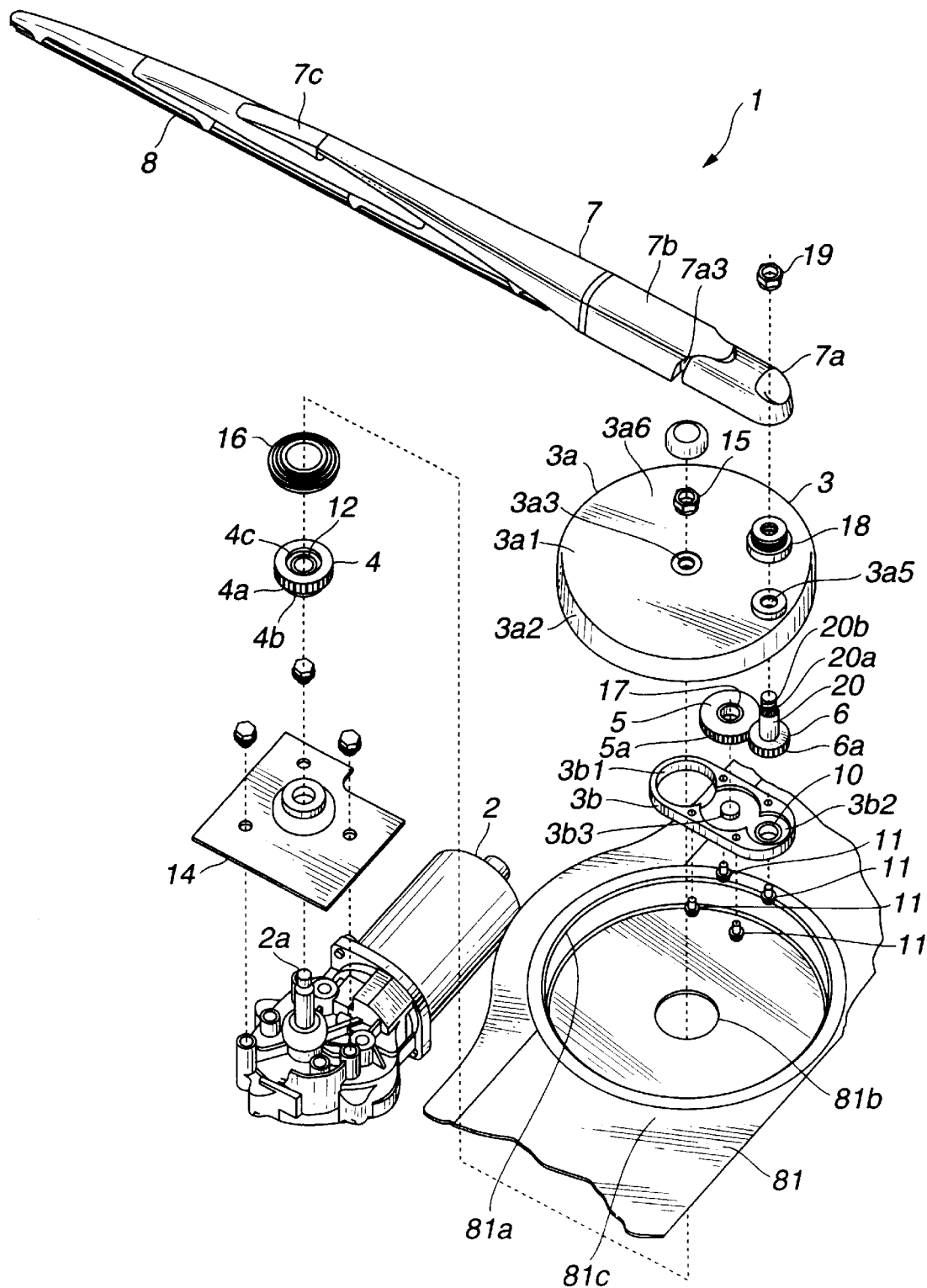
FIG. 1 is an exploded perspective view illustrating assembly of respective parts of the wiper apparatus according to an embodiment of this invention.

An embodiment of the wiper apparatus according to this invention will be described below on basis of FIG. 1 to FIG. 6.

The wiper apparatus 1 shown in figures is mainly composed of a wiper motor 2, a rotary housing 3, a stationary gear 4, an idler gear 5, a output gear 6, a wiper arm 7 and a wiper blade 8.

The wiper motor 2 of a reversible type is mechanically connected with an output shaft 2a through reduction gears, and connected electrically to the wiper control circuit (not shown).

Figure 3:
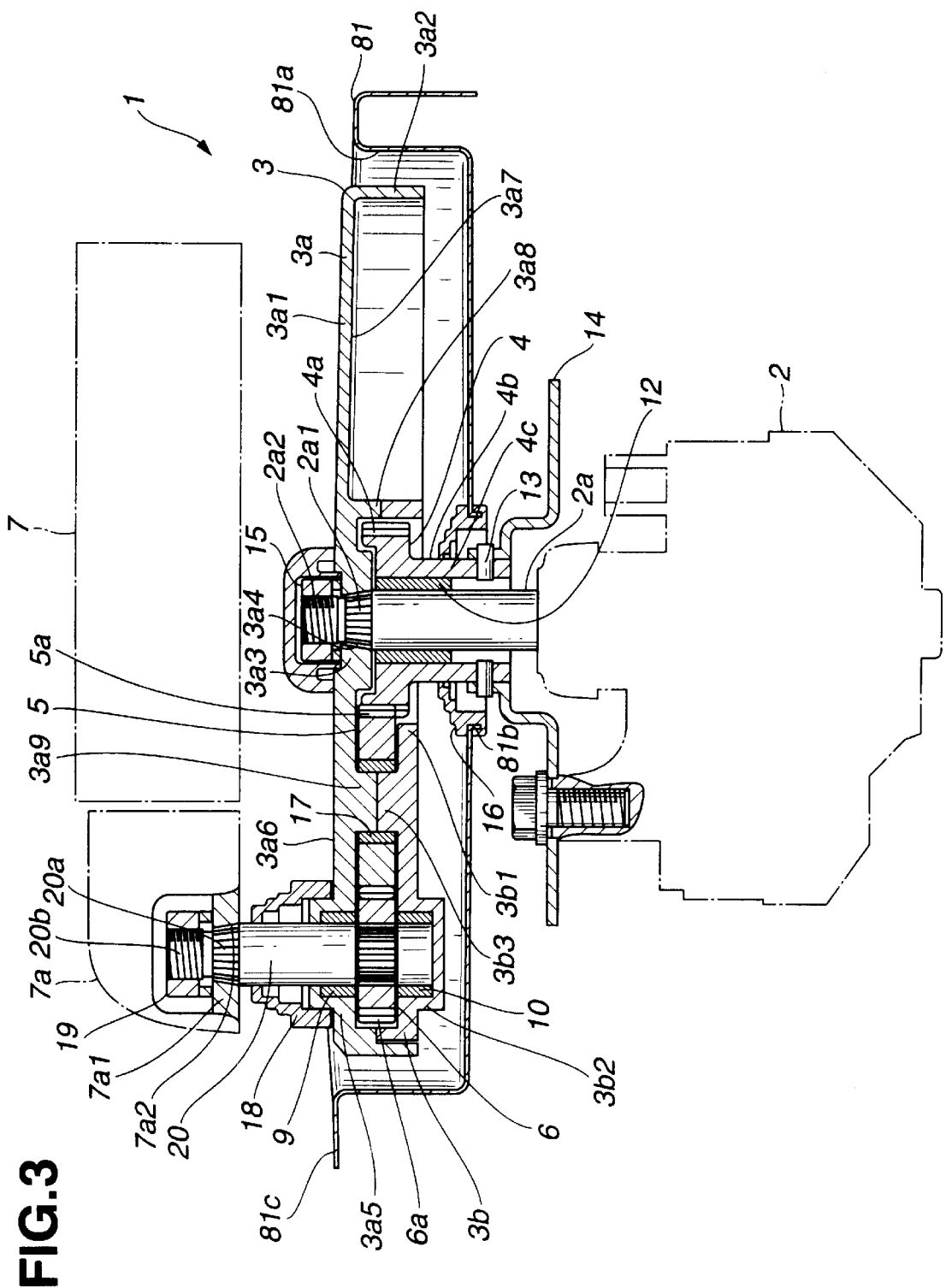
FIG. 3 is a cross sectional view of the wiper apparatus shown in FIG. 1.

The output shaft 2a is so structured as to be rotated reciprocally by changing the direction of electric current to be supplied to the wiper motor 2 alternately when a wiper switch provided in the wiper control circuit is switched into operation mode, and so designed as to make reciprocal rotation intermittently at predetermined intervals if the wiper switch is switched into intermittent mode. The output shaft 2a is formed with a serration 2a1 and a thread 2a2 at the top end thereof, as shown in FIG. 3.

Figure 2:
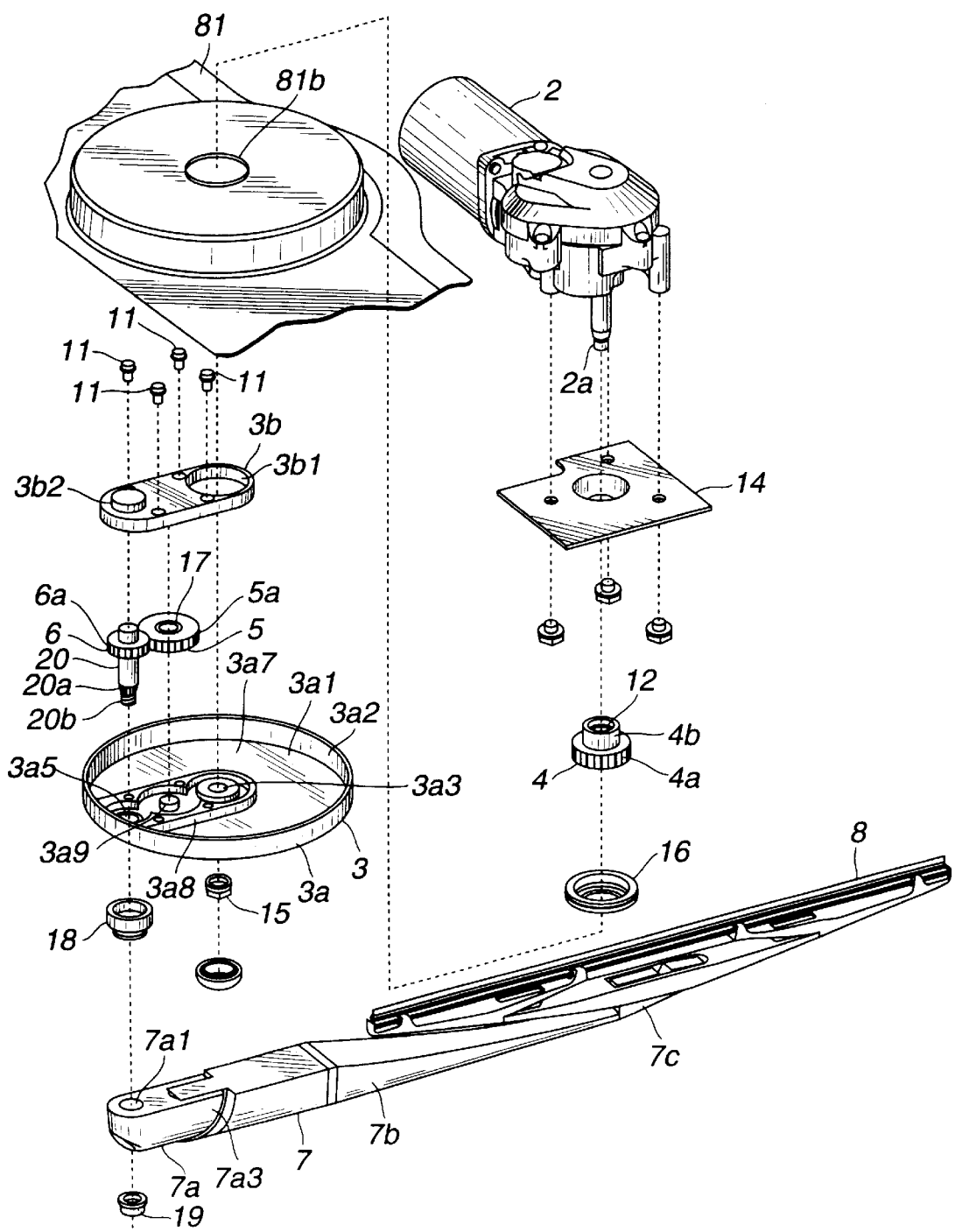
FIG. 2 is an exploded perspective view of the parts of the wiper apparatus from the reverse side shown in FIG. 1.

The rotary housing 3 is formed in a circular shape and and composed of an upper half 3a and a lower half 3b. The upper half 3a is further composed of aqn upper plate 3a1 and a side plate 3a2 as shown in FIGS. 1 and 2.

The disc-shaped upper plate 3a1 is formed with a round shaped joining hole 3a3 to be joined with the output shaft 2a in the center thereof. The joining hole 3a3 is provided with a serration receiver 3a4.

The upper plate 3a1 is further formed wityh a shaft hole 3a5 for supporting the output gear 6 at a place near to the outer periphery thereof. The shaft hole 3a5 is disposed with a first bearing 9.

The upper face 3a6 of the upper plate 3a1 is flattened. The upper plate 3a1 is formed with an oval-shaped lower half-connecting portion 3a8 from the center (joining hole 3a3) toward the outer periphery (shaft hole 3a5) on the lower face 3a7 thereof. The lower half-connecting portion 3a8 is formed with a projection 3a9 for supporting the idler gear 5 rotatably by projecting in a shaft-like shape in the center thereof.

The side plate 3a2 is formed in a cylindrical shape and joined on the outer periphery of the upper plate 3a1.

The lower half 3b is formed in an oval plate-like shape to be fitted with the lower half-connecting portion 3a8 of the upper half 3a, formed with a round hole 3b1 for containing the stationary gear 4 at an end side thereof, and is provided with a shaft holder 3b2 for rotatably supporting the output gear 6 at another end side thereof. The shaft hole 3b2 is disposed with a second bearing 10. The lower half 3b is further formed with a projection 3b3 projecting in a shaft-like shape for supporting the idler gear 5 rotatably in the center thereof.

The lower half 3b is joined to the lower half-connecting portion 3a8 of the upper half 3a with screws 11.

The rotary housing 3 composed of the upper and lower halves 3a and 3b is contained with the stationary gear 4, the idler gear 5 and the output gear 6 therein.

The stationary gear 4 is provided with a spur gear part 4a and a boss part 4b in one body. The boss part 4b is formed in a cylindrical shape. The axle of the stationary gear 4 is hollow to form a through hole 4c for passing through the output shaft 2a. The stationary gear 4 is disposed with a third bearing 12 in the though hole 4c.

The boss part 4b of the stationary gear 4 is filled into a bracket 14 and fixed to the bracket 14 with lock pins 13, consequently the stationary gear 4 is secured to a vehicle body 81 through the bracket 14 so as not to move.

The wiper motor 2 is secured to the vehicle body 81 (back door outer panel in this embodiment) through the bracket 14 on the inner side of the panel 81, and the output shaft 2a protrudes outwardly through a grommet 16 fitted into a shaft hole 8ab formed in the back door outer panel 81.

The output shaft 2a is passed through the third bearing 12 in the through hole 4c of the stationary gear 4. Furthermore, the output shaft 2a is passed through the joining hole 3a3 of the upper half 3a of the rotary housing 3, the serration 2a1 of the output shaft 2a is fitted into the serration receiver 3a4 of the upper half 3a, and the output shaft 2a is fixed to the upper half 3a of the rotary housing 3 by securing a nut 15 onto the thread 2a2 of the output shaft 2a.

The rotary housing 3 is contained in a cavity 81a formed in the outer panel 81 of the vehicle body and structured so as to rotate in the cavity together with the output shaft 2a.

The stationary gear 4 is disposed so as not to rotate independently from the rotation of the output shaft 2a as described above, and meshed with the idler gear 5 at the spur gear part 4a thereof.

The idler gear 5 is formed with a spur gear part 5a to be meshed with the spur gear part 4a of the stationary gear 4 at the outer peripheral part thereof. The idler gear 5 is fitted with a fourth bearing 17 in the center thereof, and supported rotatably by the projections 3a9 and 3b3 of the upper and lower halves 3a and 3b of the rotary housing 3 through the bearing 17.

The idler gear 5 revolves round the stationary gear 4 while turning round on its own axis according to the reciprocal rotation of the rotary housing 3. The idler gear 5 is meshed with the output gear 6 at the spur gear part 5a.

The output gear 6 is formed with a spur gear part 6a to be meshed with the spur gear part 5a of the idler gear 5 at the outer peripheral part thereof. The output gear 6 is fixed with a pivot shaft 20 in one body at the axial center thereof. The pivot shaft 20 is formed with a serration 20a and a thread 20b at the top end thereof, and supported in the upper and lower halves 3a and 3b of the rotary housing 3. The pivot shaft 20 is covered by the sealing member 18 at the portion projecting from the upper half 3a, engaged with a pivot hole 7a1 formed in a arm head 7a of the wiper arm 7 at the serration 20a, and connected with the wiper arm 8 by screwing a nut 19 into the thread 20b thereof.

The output gear 6 is so designed as to revolve around the stationary gear 4 according to the reciprocal rotation of the rotary housing 3 through the rotation of the idler gear 5. The ratio 3:2 is selected for the gear ratio of the stationary gear 4 and the outer gear 6 in this embodiment.

The pivot shaft 20 is reciprocally rotated against the rotary housing 3 through the stationary gear 4, the idler gear 5 and the output shaft 6 according to the reciprocal rotation of the rotary housing 3 together with the output shaft 2a, thereby oscillating the wiper arm 7 between first turning position B1 and second turning position B3 on the window pane.

The wiper arm 7 is provided with the arm head 7a, a retainer 7b and an arm piece 7c.

The arm head 7a of the wiper arm 7 is formed with the pivot shaft hole 7a1 at the base end thereof as described above, and formed with a serration receiver 7a2 to be engaged with the serration 20a of the pivot shaft 20 in the pivot shaft hole 7a1. The arm head 7a is provided with a retainer connector 7a3 at the opposite end thereof, and connected movably to the base end of the retainer at the retainer connector 7a3.

The retainer 7 is secured with the base end of the arm piece 7c at the top end thereof by riveting, and the arm piece 7 is attached with the wiper blade 8 at the top end thereof. Furthermore, an arm spring (not shown) is engaged between the base end of the arm piece 7c and the top end of the arm head 7a, accordingly the wiper blade 8 is pressed against the window pane according to elasticity of the arm spring.

Figure 4:
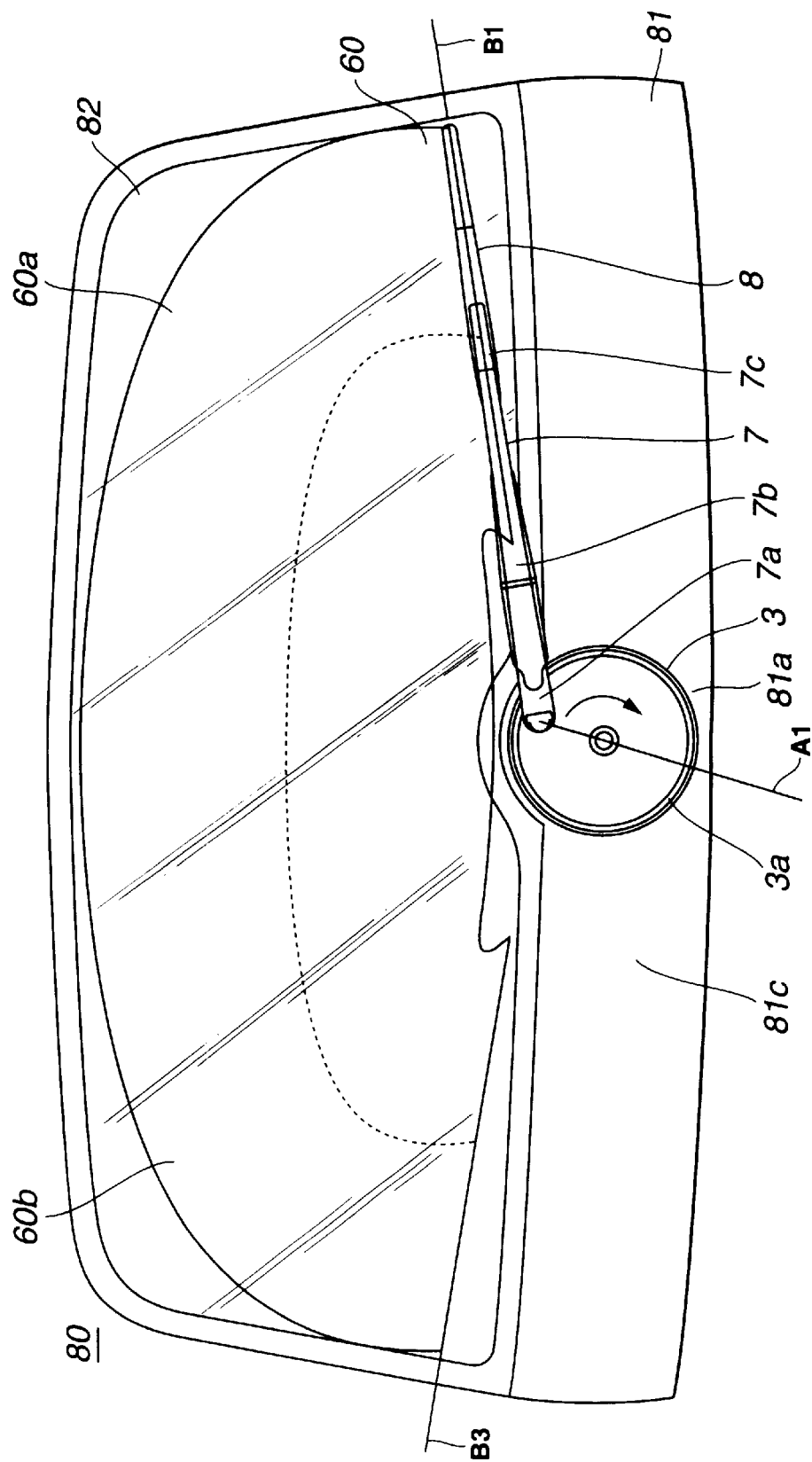
FIGS. 4 to 6 are front views illustrating the working of the wiper apparatus shown in FIG. 1, respectively.

The above-mentioned wiper apparatus 1 is installed to a back door panel 80 of the vehicle body shown in FIG. 4. The back door outer panel 81 of the back door panel 80 is formed with the circular shaped cavity 81a at the center on the lower side of the window pane 82 (back door glass) as shown in FIG. 4. The inner diameter of the cavity 81a is slightly larger than the outer diameter of the rotary housing 3, and the depth of the cavity 81a is slightly larger than thickness of the rotary housing 3.

The rotary housing 3 is joined to the output shaft 2a projecting into the cavity 81a of the back door outer panel 81 as described above, and contained in the cavity 81a so that the upper face 3a6 of the rotary housing 3 and the outer face 81a of the back door outer panel 81 may be in one plane. Further, the outer diameter of the rotary housing 3 is so designed as to be slightly smaller than the inner diameter of the cavity 81a, therefore foreign substances or the like never get between the cavity 81a.

In the wiper apparatus 1, the rotary housing 3 is in the position A1 and the wiper blade 8 is in the first turning position B1 as shown in FIG. 4 when the wiper switch provided in the wiper control circuit is switched off (stop mode).

If the output shaft 2a starts the rotation in the clockwise direction in FIG. 4 by switching the wiper switch in the wiper control circuit into the operation mode, the rotary housing 3 starts the rotation in the clockwise direction together with the output shaft 2a, whereby the idler gear 5 is rotated in the clockwise direction while revolving in the clockwise direction around the stationary gear 4 together with the rotary housing 3 and the output gear 6 is rotated in the anti-clockwise direction together with the pivot shaft 20. Accordingly, the wiper blade 8 starts from the first turning position B1 and begins the wiping operation toward the second turning position B3 on the window pane 82.

Figure 5:
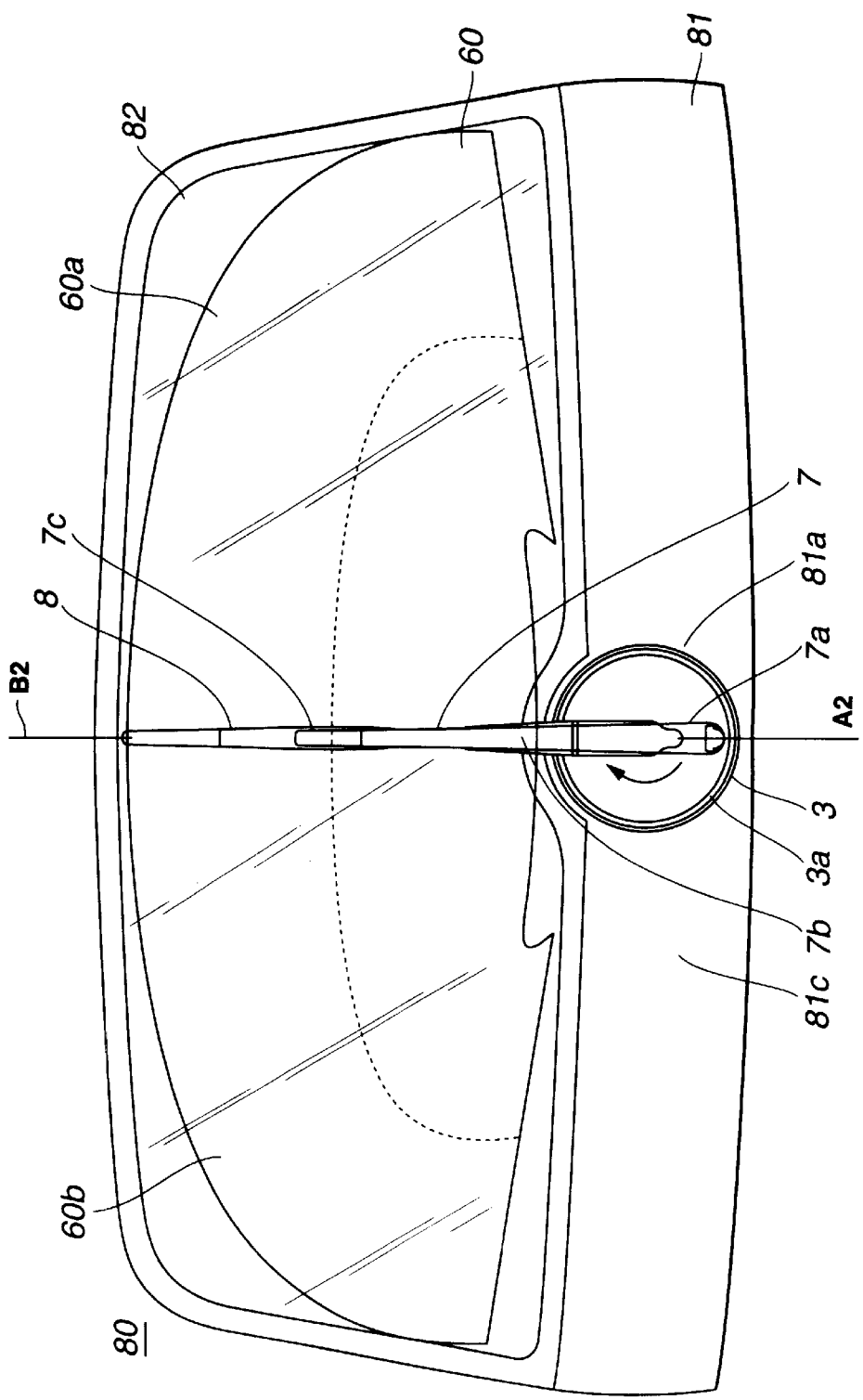

While the rotary housing 3 is rotated up to the position A2 according to the continuation of the clockwise rotation of the output shaft 2a and the wiper blade 8 attains to the center position B2 of the window pane 82 as shown in FIG. 5, the wiper blade 8 wipes the right side section 60a of the wiping area 60 without leaving unwiped zone on the window pane 82.

Figure 6:
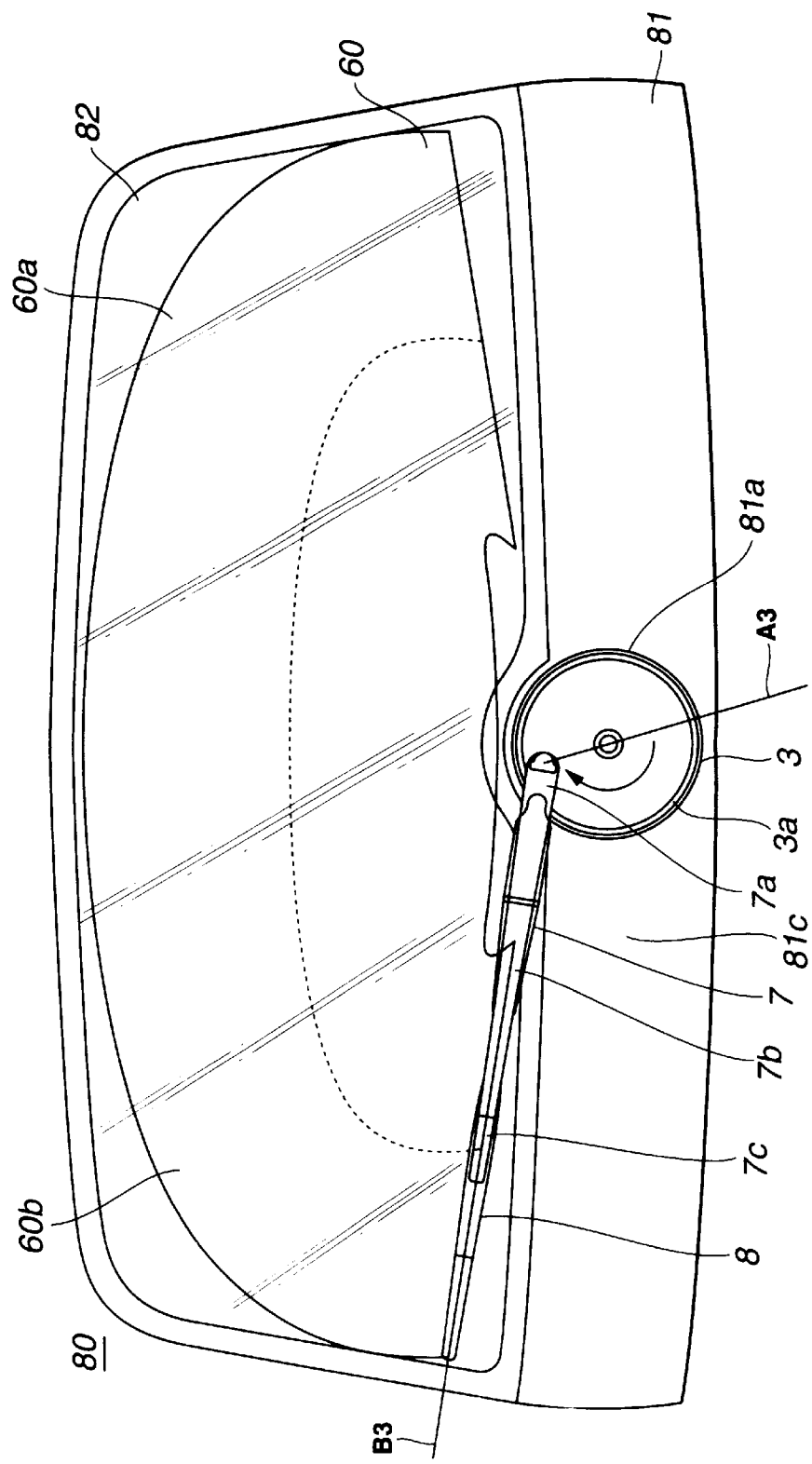

Furthermore, while the rotary housing 3 is rotated up to the position A3 according to the further clockwise rotation of the output shaft 2a and the wiper blade 8 attains to the second turning position B3 as shown in FIG. 6, the wiper blade 8 wipes the left side section 60b of the wiping area 60 without leaving unwiped zone on the window pane 82. Namely, in the wiper apparatus 1, the wiping area 60 becomes wider in the horizontal direction by using the planetary gear (the stationary gear 4, the idler gear 5 and the output gear 6), because it is possible to shift the wiper blade 8 closer to the output shaft 2a as much as a distance between the output shaft 2a and the pivot shaft 20 at the time of wiping the center position B2 of the window pane 82, and possible to move the wiper blade 8 away from the output shaft 2a as long as the distance between the shafts 2a and 20 at the time of wiping the upper portions on the both sides of the window pane 82.

When the wiper blade 8 attains to the second turning position B3, the wiper control circuit is designed so as to change the direction of an electric current to be supplied to the wiper motor 2. Accordingly, the rotary housing the rotary housing 3 starts the anti-clockwise rotation together with the output shaft 2a after the arrival of the wiper blade 8 in the second turning position B3, whereby the idler gear 5 is rotate in the anti-clockwise direction while revolving in the anti-clockwise direction around the stationary gear 4 together with the rotary housing 3 and the output gear 6 is rotated in the clockwise direction together with the pivot shaft 20. Therefore, the wiper blade 8 starts the wiping operation toward the first turning position B1. After this, the wiping operation is continued by repeating the turn at the first and second turning positions B1 and B3 until the wiper switch in the control circuit is switched off (stop mode).

If the wiper switch is changed into the stop mode when the wiper blade 8 is in a position between the turning positions, the power supply is continued to the wiper motor 2 from the wiper control circuit until the wiper blade 8 returns to the first turning position B1 according to functioning of the auto-stop circuit housed in the wiper motor 2, and the power supply to the wiper motor 2 is cut off at the same time of arrival of the wiper blade 8 at the first turning position B1, thereby stopping the wiper blade 8 in the first turning position B1.

As mentioned above, according to the wiper apparatus of this invention, which is provided with the stationary gear, the idler gear and the output gear, it is possible to widen the wiping area into the laterally elongated shape in accordance with the shape of the window of the vehicle and possible to wipe the window pane of the laterally elongated type without leaving the unwiped zone. Furthermore, the aforementioned gears, those are the stationary gear, the idler gear and the output gear are disposed in the rotary housing formed in a circular shape, therefore it is also possible to prevent foreign substances from being caught between the wiper members.

What is claimed is:

1. A wiper apparatus for wiping a window pane of a vehicle comprising:

a wiper motor of a reversible type fixed on a body of said vehicle;

a output shaft rotated reciprocally by said wiper motor in clockwise and anti-clockwise directions alternatively;

a rotary housing fixed to said output shaft for rotating reciprocally together with the output shaft;

a stationary gear disposed coaxially around about said output shaft and fixed on said vehicle body;

an idler gear supported rotatably on said rotary housing and meshed with said stationary gear for reciprocally rotating on said rotary housing according to the reciprocating rotation of said rotary housing;

an output gear supported rotatably on said rotary housing and driven rotationally by engaging with said idler gear;

a pivot shaft supported rotatably on said rotary housing and fixed to said output gear; and wiper members connected to said pivot shaft;

wherein said rotary housing is formed in a circular shape, fixed coaxially to said output shaft and has a radius sufficient to house said stationary gear, said idler gear and said output gear; and wherein said rotary housing is contained in a cavity formed on said vehicle body.

2. A wiper apparatus as set forth in claim 1, wherein said rotary housing has an upper face even with that of said vehicle body.

3. A wiper apparatus as set forth in claim 2, wherein gear ratios of said stationary gear and said output gear are three to two.

4. A wiper apparatus as set forth claim 1, in wherein said rotary housing is composed of an upper half provided with a side plate formed in a cylindrical shape, and an lower half formed in an elliptic shape and housing said stationary gear, said idle gear and said output gear.

5. A wiper apparatus as set forth in claim 4, wherein gear ratios of said stationary gear and said output gear are three to two.

* * * * *